United States Patent

Ayres et al.

[15] 3,662,187

[45] May 9, 1972

[54] FAST ANALOG MULTIPLIER

[72] Inventors: Dwight T. Ayres, Boalsburg; Leon H. Sibul, State College, both of Pa.

[73] Assignee: The United States of America as represented by the Secretary of the Navy

[22] Filed: July 1, 1971

[21] Appl. No.: 158,840

[52] U.S. Cl. ..........................307/229, 235/194, 307/220 C, 307/304, 328/143, 328/160, 330/30 D

[51] Int. Cl. ..........................................................G06g 7/12

[58] Field of Search............307/220 R, 220 C, 225 R, 225 C, 307/229, 304; 328/30, 104, 143, 160; 235/194; 330/30 D

[56] References Cited

UNITED STATES PATENTS

| | | | |
|---|---|---|---|
| 3,117,242 | 1/1964 | Slack | 235/194 X |
| 3,202,840 | 8/1965 | Ames, Jr. | 307/225 C |
| 3,368,066 | 2/1968 | Miller et al | 328/160 X |
| 3,484,595 | 12/1969 | Krips | 307/229 X |
| 3,523,199 | 8/1970 | Phuoc et al. | 328/160 X |
| 3,544,812 | 12/1970 | Riso | 307/304 X |
| 3,562,553 | 2/1971 | Roth | 235/194 X |
| 3,569,732 | 3/1971 | Christensen | 307/220 C |
| 3,573,491 | 4/1971 | Goss et al. | 307/229 |
| 3,588,713 | 6/1971 | Yareck | 328/160 |
| 3,600,605 | 8/1971 | Lehmann | 328/143 X |

*Primary Examiner*—Stanley T. Krawczewicz
*Attorney*—R. S. Sciascia et al.

[57] ABSTRACT

Subject disclosure relates to novel and improved high speed analog apparatus which employs field effect transistors connected in a balanced bridge circuit to obtain the product of two arbitrary input signals. One input signal drives the source-drain circuits of the field effect transistors and the other input signal drives the gate circuits of the field effect transistors. A portion of the one signal is also coupled to the gate circuits of the field effect transistors to extend the dynamic range of the same.

5 Claims, 1 Drawing Figure

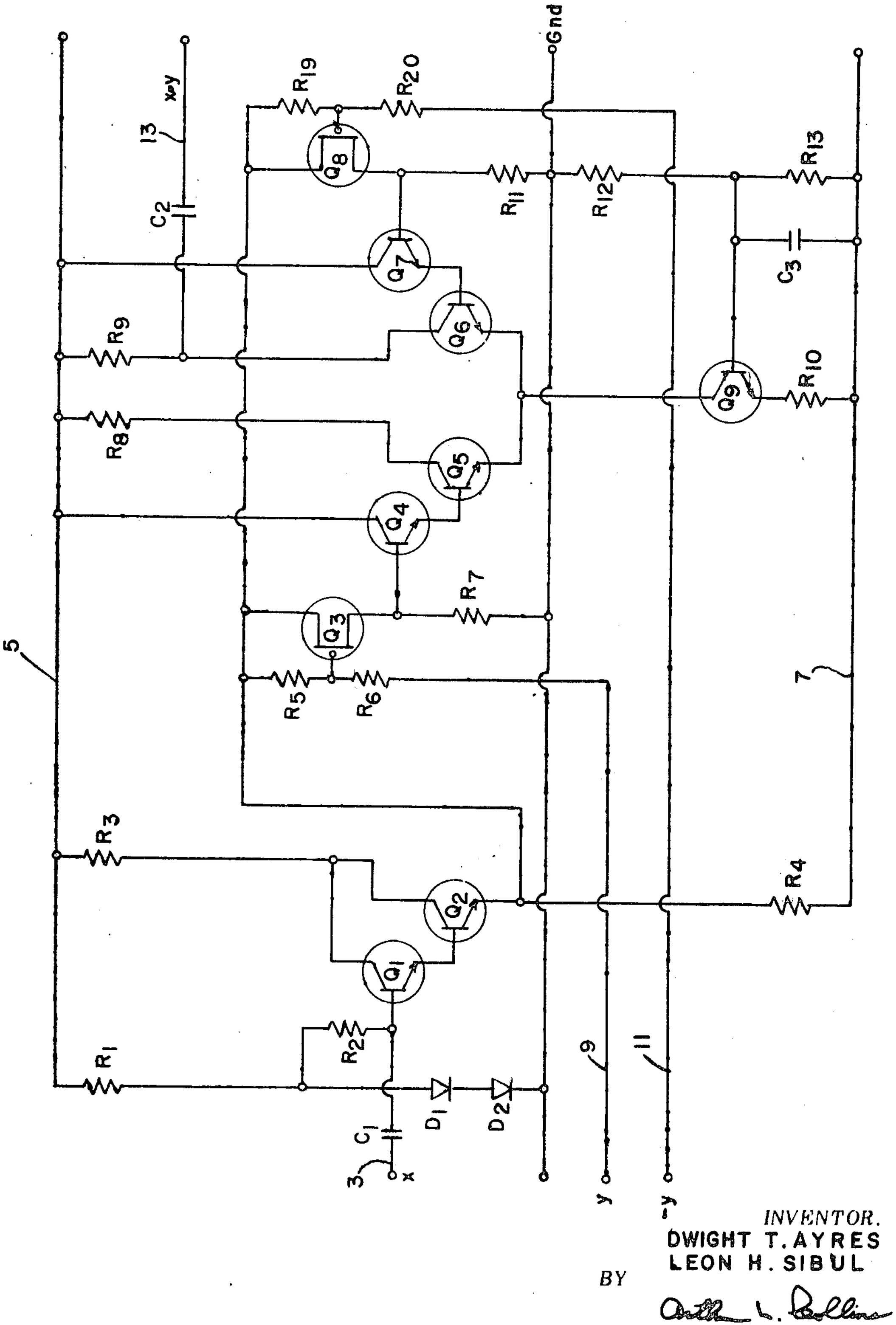
INVENTOR.
DWIGHT T. AYRES
LEON H. SIBUL
BY
[signature]
ATTORNEY

FAST ANALOG MULTIPLIER

Various types of non-linear devices such as diodes, thermistors and thyrites have been used in the past for analog multiplication. In diode multipliers, advantage is taken of the logarithmic diode characteristic and the multiplication is reduced to the addition of logarithms. Diodes used in logarithmic multipliers, however, are highly sensitive to temperature variations. Multipliers using thermistors and thyrites are also sensitive to temperature change and relatively slow acting. Moreover, the various previously used multiplier devices have had severe dynamic range limitations.

It is therefore a principal object of the present invention to provide a novel and improved analog multiplier device which employs field effect transistors connected in a balanced bridge circuit.

It is a further object of the invention to provide a novel and improved analog multiplier device which exhibits a high degree of temperature and bias stability.

It is a further object of the invention to provide a novel and improved analog multiplier device which operates satisfactorily over an extended dynamic range.

Other objects and many of the attendant advantages of this invention will be readily appreciated as the same becomes better understood by reference to the following detailed description when considered in connection with the accompanying drawing wherein:

The single FIGURE of the drawing is a schematic circuit diagram of a preferred embodiment of the invention.

As shown in the drawing, a first signal source on conductor 3 which represents one of the parameters that is to be multiplied in the circuit is coupled to the base of transistor $Q_1$ through condenser $C_1$. The base of transistor $Q_1$ is also coupled to the positive 20 volt D.C. supply line 5 by the voltage divider network that includes resistors $R_1$ and $R_2$ and diodes $D_1$ and $D_2$. The collector of transistor $Q_1$ is connected to the collector of transistor $Q_2$ and its emitter is connected to the base of transistor $Q_2$. The emitter-collector circuit of transistor $Q_2$ extends from the positive voltage supply line 5 through resistor $R_3$, through the transistor $Q_2$ and through resistor $R_4$ to the negative 20 volt DC supply line 7. The emitter of transistor $Q_2$ is connected to the drain contacts of the field effect transistors $Q_3$ and $Q_8$. The source contacts of field effect transistors $Q_3$ and $Q_8$ are coupled to ground respectively through resistors $R_7$ and $R_{11}$. Resistors $R_5$ and $R_{19}$ are respectively connected between the drain and gate contacts of field effect transistors $Q_3$ and $Q_8$. The second signal source that represents the other parameter that is to be multiplied in the circuit provides a signal *y* on conductor 9 that is coupled to the gate contact of field effect transistor $Q_3$ through resistor $R_6$ and a signal −*y* on conductor 11 that is equal in magnitude but opposite in polarity to signal y on conductor 9 and is coupled to the gate contact of field effect transistor $Q_8$ through resistor $R_{20}$.

The source contacts of field effect transistors $Q_3$ and $Q_8$ are respectively connected to the bases of transistors $Q_4$ and $Q_7$. The collectors of transistors $Q_4$ and $Q_7$ are connected to the positive power supply line 5 and their emitters are respectively connected to the bases of transistors $Q_5$ and $Q_6$. The emitter-collector circuit of transistor $Q_5$ extends from the power supply line 5 through resistor $R_8$ through transistors $Q_5$ and $Q_9$ and through resistor $R_{10}$ to the negative power supply line 7. The emitter-collector circuit of transistor $Q_6$ extends from the power supply line 5 through resistor $R_9$, through transistors $Q_6$ and $Q_9$ and through resistor $R_{10}$ to the negative power supply line 7. The base of transistor $Q_9$ is connected to the voltage divider network of resistors $R_{12}$ and $R_{13}$ between the negative power supply line 7 and ground. Condenser $C_3$ also couples the base of transistor $Q_9$ to ground. Conductor 13 which provides the product output signal of input signals x and y is coupled to the collector of transistor $Q_6$ through condenser $C_2$.

In operation, the input signal x on conductor 3, which as indicated above, represents one of the parameter multiplicands in analog multiplier apparatus of the invention, is first power amplified (but not voltage amplified) by the high gain compound connected circuits of transistors $Q_1$ and $Q_2$, this drives the bridge from a very low impedance source without appreciably loading down the signal voltage on conductor 3. The amplified signal *x* is then applied across the bridge circuit of field effect transistors $Q_3$ and $Q_8$ and resistors $R_7$ and $R_{11}$. The input signals *y* and −*y* on conductors 9 and 11 which represent the other of the parameter multiplicands in the analog multiplication operation are applied to the gate contacts of field effect transistors$Q_3$ and $Q_8$. The unbalance of the bridge circuit across the source contacts of field effect transistors $Q_3$ and $Q_8$ provides a measure of the product of signals x and y. This product signal *x·y* across the source contacts of transistors $Q_3$ and $Q_8$ is detected in the difference amplifier circuit of transistors $Q_4$, $Q_5$, $Q_6$, $Q_7$ and $Q_9$ and their associated circuits. The common mode rejection and the easily realizable gain of the differential amplifier permit use of the variable gain field effect transistors over a portion of their dynamic range to achieve essentially linear operation. The circuit of transistor $Q_9$ in the common emitter of the difference amplifier provides a high effective resistance and further improved common mode rejection ratio.

A portion of the amplified signal x from the buffer amplifier of transistors $Q_1$ and $Q_2$ is applied to the gates of field effect transistors $Q_3$ and $Q_8$ through resistors $R_5$ and $R_{19}$. This further increases the effective dynamic range of the field effect transistors in the circuit. Thus, when an increase in the amplifier signal *x* tends to raise the average resistance of the field effect transistor and the fraction of the amplified signal *x* developed across resistor $R_5$ or $R_{19}$ decreases, the portion of the amplified signal *x* developed across resistor $R_5$ or $R_{19}$ decreases the potential of the field effect transistor gate contact and its channel resistance. By proper selection of resistances $R_5$ and $R_{19}$, the net field resistance variation can be reduced and the dynamic range of the circuit is improved.

It is to be understood that, although field effect transistors are preferably used as the controlled devices in the bridge circuit, other controlled devices such as variable *u* vacuum tubes, diodes, varistors and thermistors could be used without departing from the spirit or scope of the invention.

It is also to be understood that other bridge arrangements such as use of additional field effect transistors in place of resistors $R_7$ and $R_{11}$ or placement of resistors on the drain side of the field effect transistors or transposition of either resistor $R_7$ or $R_{11}$ with either transistor could be provided without departing from the spirit or scope of the invention.

Although use of the above described differential amplifier, buffer and bias control circuits were found to be most effective in the practice of the invention, other standard service circuits could be used in their place without departing from the spirit or scope of the invention.

Obviously, many modifications and variations of the present invention are possible in the light of the above teachings. It is therefore to be understood that within the scope of the appended claims, the invention may be practiced otherwise than as specifically described.

What is claimed is:

1. An analog multiplier device comprising:

a. a pair of field effect transistors, each of said transistors having a source contact, a drain contact and a gate contact;

b. a load impedance associated with each field effect transistor, one terminal of each impedance being connected to one side of the source-drain circuit of its associated field effect transistor;

c. a first signal source having a single output, the voltage of said source referenced to ground, said first signal conductor connected to the source-drain circuit of each of said field effect transistors on the side opposite from said load impedance of each of said field effect transistors;

d. a second signal source having a pair of output conductors that provide signals of equal magnitude and opposite polarity;

e. means coupling one conductor of the second signal source to the gate contact of one field effect transistor and the other conductor of the second signal source to the gate contact of the other field effect transistor;

f. means for detecting the difference in potential between the junction of one field effect transistor with its associated impedance and the junction of the other field effect transistor with its associated impedance;

g. and means for increasing the dynamic range of each of the field effect transistors.

2. The device substantially as described in claim 1 wherein the difference in potential detecting means is a differential amplifier.

3. The device substantially as described in claim 1 and further including a buffer amplifier between the first signal source and the source-drain circuit of the field effect transistors.

4. The device substantially as described in claim 1 wherein the means for increasing the dynamic range of the field effect transistors includes means for applying a predetermined portion of the potential of the first signal source to the gate contacts of the field effect transistors.

5. The device substantially as described in claim 1 wherein the means for increasing the dynamic range of the field effect transistors includes an impedance coupled between the source-drain circuits of the field effect transistors and their gate contacts.

* * * * *